PROCESSING OF SOFT MAGNETIC MATERIALS

Filed June 18, 1959

INVENTORS: W.B. GIBBS
C.V. WAHL
D.H. WENNY JR.
BY
George S. Indig
ATTORNEY

United States Patent Office 3,086,280
Patented Apr. 23, 1963

3,086,280

PROCESSING OF SOFT MAGNETIC MATERIALS

William B. Gibbs, Burlington, N.C., and Charles V. Wahl, Hazlet, and Daniel H. Wenny, Jr., West Orange, N.J.; said Gibbs assignor to Western Electric Company, Incorporated, New York, N.Y., a corporation of New York; said Wahl and said Wenny, Jr., assignors to Bell Telephone Laboratories, Incorporated, New York, N.Y., a corporation of New York Filed June 18, 1959, Ser. No. 821,138
5 Claims. (Cl. 29—155.5)

This invention relates to a method of fabricating soft magnetic materials to produce tapes and wires which exhibit predetermined magnetic characteristics. The present invention is of interest in the production of thin tape for use in memory structures of the type described in copending application Serial No. 675,522, filed August 1, 1957 by A. H. Bobeck.

Recent developments have indicated that memory storage devices may be constructed using soft magnetic materials in various configurations. (See aforementioned copending application by Bobeck.) The basic mode of operation of such memory structures involves changing the direction of magnetization of portions of a soft magnetic wire or tape by applying external magentic forces. Thus, for example, a preferred or "easy" magnetic flux path is established in a soft magnetic tape by one of various known methods. An information bit may be stored in the tape by subjecting it to an external magnetic force oriented in a direction parallel to the preferred magnetic flux path of the tape and of a magnitude at least equal to the coercive force of the tape. As a result of exposure to such external magnetic force, the magnetic domains of the tape become oriented in the direction of the applied magnetic force. Thus this particular orientation is representative of a particular information bit, and this information bit is considered to be stored until the magnetic state of the tape is altered. In the conventional magnetic memory type of structure, removal from storage of this information bit, or read-out, may be effected by subjecting the magnetic material to an external magnetic force which has an orientation direction opposite to the direction of magnetization of the tape and which has a magnitude equal to at least double the coercive force of the tape.

The memory structures which are based on the above-described principles usually consist of arrays of magnetic storage elements arranged in a geometrical pattern. As mentioned above, the coercive force of the magnetic material plays an important role in the operation of magnetic memory structures, a value in the range of from 4 to 5 oersteds having been found to produce satisfactory operation of one type of such structures. Another equally important characteristic is the squareness ($B_r/B_s$) of the hysteresis loop of the magnetic material. The squareness of the hysteresis loop is determinative of the time required to switch the direction of magnetization of the magnetic material, such switching time being approximately inversely propotional to the squareness. Since low switching times are desirable, magnetic materials having high values of squareness, for example of the order of .9 or greater, are perferred for this use. The magnetic material employed in the fabrication of such arrays is preferably possessed of substantially uniform magnetic characteristics to assure uniformity of response throughout the entire system.

None of the magnetic materials of the prior art has been found to have the requisite combination of coercive force and squareness required by the above-mentioned memory-structure application. The known magnetic materials fall into two classes; those termed soft magnetic materials such as Permalloy, Supermalloy, Permandur, and Supermandur; which have coercive forces in the fully annealed state of the order of 1/10 oersteds; and hard or permanent magnetic materials of coercive force of the order of 50 oersteds or more. In general, the squareness of both the soft and the hard magnetic materials in the fully annealed state lies below .9. It is possible to increase both the squareness and coercive force by cold-working. However there are terminal values of coercive force and squareness, beyond which cold-working produces no further increase. For many purposes, the terminal value of the coercive force, in particular, may be inadequate.

In accordance with the present invention, both the coercive force and squareness of soft magnetic materials may be tailored to fit the requirements of the desired end use. In contrast to prior art methods, the coercive force of soft magnetic materials treated in accordance with this invention may be increased considerably above their usual terminal values. Thus, for example a soft magnetic material which normally possesses a coercive force of the order of 1/10 oersteds and a squareness of the order of .2 may be processed to yield tape or wire having a coercive force in the range of from 3 to 7 and a squareness above .9. An important advantage of soft magnetic materials treated by the present invention is the substantial uniformity of magnetic characteristics attained.

The procedure of the present invention comprises the steps of cold-working a body of soft magnetic material, to form wire, heat-treating the cold-worked wire as described in detail below, and again cold-working the material to attain the desired dimensions.

The invention is more readily understood when described in conjunction with the following drawings in which.

Figures 1, 2:
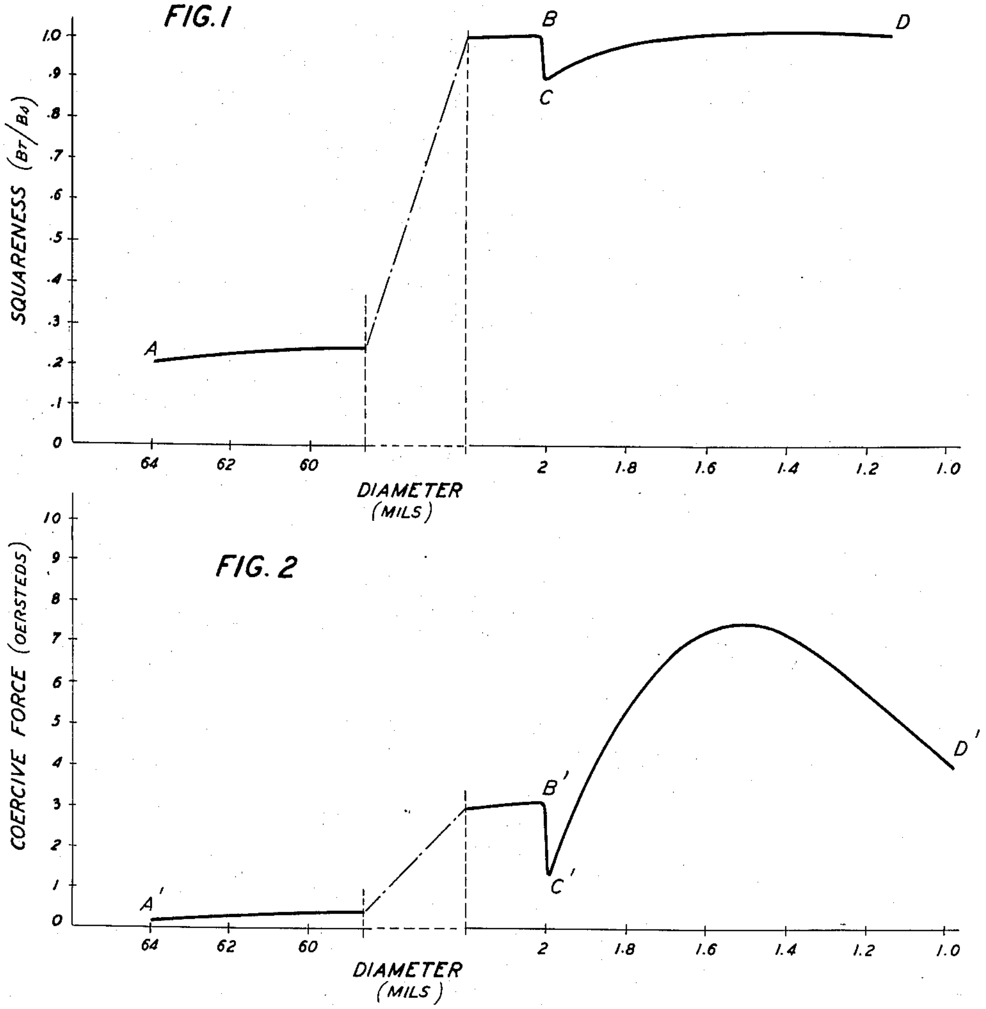
FIG. 1 is a graph depicting the squareness of a body of soft magnetic material which is processed in accordance with the present invention.
FIG. 2 is a graph depicting the coercive force of a body of soft magnetic material processed in accordance with the present invention.

With respect now more particularly to the drawings, FIG. 1 is a graph depicting squareness as a function of the diameter of a body of soft magnetic material during processing in accordance with the present invention. FIG. 2 is a graph depicting the relationship between coercive force and diameter of the body of material whose characteristics are shown in FIG. 1.

The illustrative example depicted in FIGS. 1 and 2 relates to the fabrication of soft magnetic tape. It is assumed for the purpose of this example that the finished tape is to have a coercive force of approximately 4 oersteds and a squareness of at least .9. The finished tape is to have a thickness of approximately .3 mils and a width of approximately 3 mils.

The starting material is a body of a soft magnetic material, for example, a round bar having a diameter of approximately 64 mils of Molybdenum Permalloy (4 percent molybdenum—79 percent nickel). The starting material is fully annealed and accordingly its magnetic characteristics are typical of its composition. As shown in FIGS. 1 and 2 at points A and A', respectively, the material has a squareness of approximately 0.2 and a coercive force of approximately .1 oersteds.

The production of a tape of the dimensions set forth above involves first drawing the bar through successively smaller dies to reduce its diameter. The particular types of dies employed and the methods for using them are well known in the art. (See "Practical Metallurgy" by Sachs and Van Horn, American Society of Metals, 1940.)

As indicated in FIGS. 1 and 2, both the squareness and the coercive force increase as the magnetic material is cold-worked.

The material is drawn until the diameter is reduced to approximately 2 mils. If desired, intermediate anneals of the type customarily employed in drawing processes may be used. It has been determined that the presence or absence of such anneals have no substantial effect on the magnetic characteristics of the final material.

As indicated by points B and B′ in FIGS. 1 and 2, cold-working the wire to a diameter of 2 mils results in an increase in squareness to approximately .99, and an increase in coercive force to approximately 3. These values of squareness and coercive force are terminal or limiting values in the sense that further cold-working at this stage has a negligible effect.

At this point in the procedure, the wire is annealed in accordance with the teachings of this invention. The anneal of this invention is not a complete or "dead" anneal which is commonly used in the prior art to restore the magnetic characteristics of the material to their original or normal values. As discussed in detail below, the time and temperature of the inventive anneal are interrelated and an increase in one of these parameters may necessitate a corresponding decrease in the other in order to avoid the effects of a complete anneal. As indicated by points C and C′ in FIGS. 1 and 2, the anneal results in a decrease in the squarenesss to approximately .9 and a decrease in the coercive force to approximately 1.5 oersteds.

Following the anneal, the wire is again drawn through dies to reduce the diameter to approximately 1 mil. The effect of such cold-working on the squareness and coercive force is indicated by the curve between points C and D and C′ and D′ in FIGS. 1 and 2. The squareness again rises to the terminal value of approximately .99. However, the coercive force behaves in a manner which is entirely unforeseeable in view of the prior art. As shown in FIG. 2, the coercive force rises sharply to a maximum of approximately 7.5 oersteds and then diminishes to a value of approximately 5 oersteds. Thus, the anneal appears to have a sensitizing effect on the magnetic material in that the coercive force may be increased far above its terminal value by further subsequent cold-working.

As may be seen from FIG. 2, an increase in coercive force to a value of about 3 oersteds is realized by a reduction in diameter of the wire from 2 mils to 1.9 mils, corresponding to a reduction of about 5 percent in diameter.

To convert the wire into tape, the wire is flattened on a rolling mil in a single pass to produce a tape approximately .3 mil thick and 3.5 mils wide. The flattening operation has approximately the same effect on the squareness and coercive force as further drawing, the squareness remaining substantially unchanged and the coercive force decreasing from approximately 5 to 4 oersteds.

The uniqueness of the present method for fabricating tape is brought out by contrasting the magnetic properties of tape fabricated in an identical manner to that described except for the use of an annealing step. It has been determined that the squareness of tape not annealed in accordance with this invention is reduced to approximately .5 by the flattening operation. Tape with such a low value of squareness is undesirable for memory-structure applications.

Figure 3:
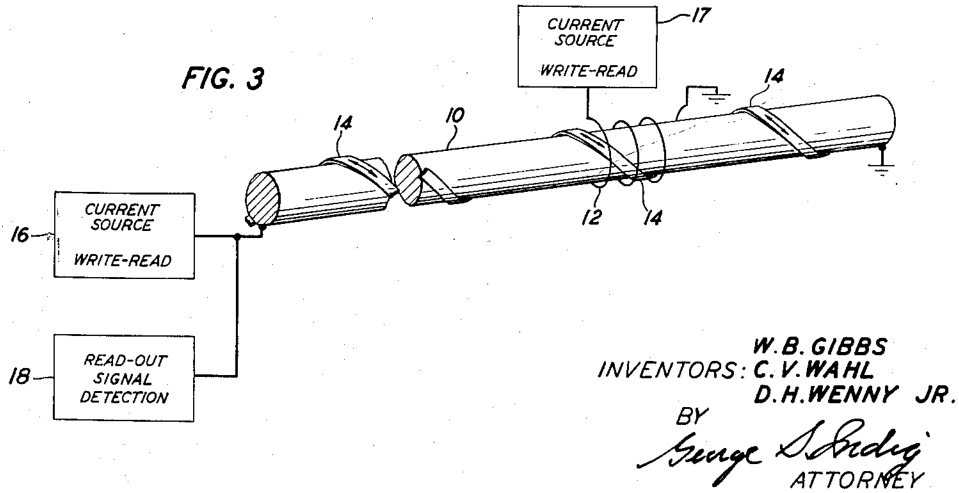
FIG. 3 depicts a magnetic memory element employing a soft magnetic tape produced in accordance with the present invention.

FIG. 3 depicts a magnetic memory element of the type described in copending application Serial No. 675,522, filed August 1, 1957, by A. H. Bobeck. The memory element utilizes a soft magnetic tape produced in accordance with the present invention. The element shown in FIG. 3 consists of a non-magnetic conductor 10 around which is wound soft magnetic tape 14. The easy direction of magnetization of the flux in winding 14 is shown by the double-ended arrows. One end of conductor 10 is connected to current source 16 and the other end is connected to ground. An external insulated solenoid 12, one end of which is connected to ground, is also connected to a current source 17 and is inductively coupled to conductor 10. Detection means 18 is employed to detect the occurrence of a change in the magnetic state of conductor 10.

A flux, oriented in a particular direction, may be induced in conductor 10 by application of electrical currents of sufficient magnitude from sources 16 and 17. The flux state of conductor 10 may be regarded as a particular information bit, which is stored. This operation constitutes the write phase of the memory function.

In formation stored in conductor 10 is read out by reversing the polarity of the currents previously applied from current sources 16 and 17. The application of such reverse current pulses causes a switch in the direction of magnetization which produces a change in electric potential between the ends of conductor 10. This change in potential is detected by means 18 as an output pulse superimposed upon the switching current pulse applied to conductor 10. A more detailed description of the operation of this memory element is beyond the scope of the present specification. Such detailed information may be found in the aforementioned copending application filed by A. H. Bobeck.

The sensitizing effect of the anneal of the present invention provides the flexibility by which the coercive force may be varied to fit a particular end use. In the example shown in FIG. 2, annealing at a diameter of 2 mils permits production of tape or wire having a coercive force of any value along the curve from C′ to D′. A different combination of coercive force and diameter may be produced merely by shifting the C′D′ portion of the curve either to the right or to the left, such shifting being accomplished by annealing either at a smaller or larger diameter, respectively. Thus, judicious choice of the diameter at which the material is annealed in conjunction with a prescribed amount of cold-working following the anneal permits production of wire or tape of the desired dimension with any coercive force between the maximum or peak value which in the example in FIG. 2 is approximately 7 oersteds and the terminal value of 3 oersteds.

As discussed above, the function of the anneal in accordance with the present invention is to sensitize the magnetic material, such sensitization being manifested by the change in coercive force and squareness with cold-working shown by curve CD and C′D′ in FIGS. 1 and 2. The temperature and time of the anneal may be varied over a wide range as indicated below.

A specific illustration of the nature of the anneal of the present invention is afforded by reference to data obtained in the treatment of a soft magnetic material comprising 4 percent molybdenum, 79 percent nickel and 15.5 percent iron, all by weight. An annealing temperature in the range of from 700° C. to 800° C. and an annealing time of 1 second produced a sensitivity in the magnetic material similar to that shown in FIGS. 1 and 2. An anneal for longer than approximately 4 seconds at these temperatures tends to produce substantial recrystallization and the sensitizing effect is largely diminished. Annealing at temperatures of the order of 900° C. or greater has the same effect as the above-mentioned increase in annealing time.

Annealing at substantially lower temperatures permits the use of longer annealing times and imparts a degree of flexibility to the process. Thus, for example, an anneal of 300° C. for a period of one hour produced a sensitivity equivalent to that shown in FIG. 2. Increasing the temperature to 500° C. and maintaining an anneal time of one hour resulted in a material having characteristics indistinguishable from that annealed at 300° C. It was determined that an anneal at 100° C. for a period of 24 hours also had the requisite sensitizing effect on the magnetic material.

Employing an anneal which is substantially less severe than those set forth above results in a decrease in the sensitizing effect. A guide to the relative severity of the anneal is afforded by reference to the decrease in coercive force which results from the anneal. Such decrease in the coercive force may be the only outward manifestations of the fact that the magnetic material has been annealed in accordance with the present invention since the change in squareness may be imperceptible. For the purpose of this invention, an anneal which produces a decrease of at least 10 percent in the coercive force is preferred. Anneals which produce a decrease of less than 5 percent in the coercive force have a sensitizing effect which is insufficient to provide a wide range of flexibility of operation.

Use of excessive annealing temperatures in conjunction with excessive annealing times so as to cause substantial recrystallization does not result in a sensitizing effect on the magnetic material. To provide a high degree of flexibility, an anneal in accordance with this invention preferably should not produce a decrease in squareness substantially greater than 25 percent. Anneals which cause a decrease of 50 percent or greater appreciably reduce the degree of sensitivity produced in the magnetic material, and consequently, the advantages gained thereby are substantially lessened.

The environment in which the annealing step is conducted has no appreciable effect on the magnetic characteristics of the material. Anneals in accordance with the present invention have been conducted employing atmospheres of nitrogen, hydrogen, and mixtures thereof with no apparent differences in the material so treated. Atmospheres which do not react with the magnetic materials are preferred.

In the example described above in connection with FIGS. 1 and 2, the anneal was conducted at a stage in the process at which the squareness and coercive force of the material had attained terminal value as a result of cold-working. This is not essential to the success of the present invention. The only requirement in this respect is that the material not be in its fully annealed state, i.e., that the material be in a strained condition produced by cold-working. However, the degree of sensitivity which is produced by annealing in accordance with this invention is maximized if the anneal is conducted on material which has attained terminal values of coercive force and squareness.

Although the illustrative example described above involved one particular nickel-containing soft magnetic alloy, it is to be understood that the present invention is applicable to the entire class of nickel containing soft magnetic materials, in particular those alloys containing between 45 percent to 80 percent nickel by weight. Thus, for example, an alloy comprising approximately 52 percent nickel and 48 percent iron was found to react in the same manner as the 75 percent nickel alloy described above when treated in accordance with the inventive process.

Tape produced in accordance with this invention has been employed in the construction of a magnetic memory array employing elements of the type shown in FIG. 3. The elements consisted of a copper wire wrapped with a soft magnetic tape. The magnetic tape wrapping was in the form of a helix and the preferred flux path in the wire from which the tape was fabricated was axial. Accordingly, the easy direction of magnetization of the tape was along its length. Molybdenum Permalloy is preferred for this use since it is essentially non-magnetostrictive, i.e., a change in dimensions resulting from strain has a negligible effect on its magnetic characteristics. This is important since there is necessarily a certain amount of elongation and compression of the tape attendant upon the wrapping operation. Clearly a material exhibiting a large magnetostrictive effect would be desirable by reason of the random variations in magnetic properties introduced during the fabrication of the basic units.

Examples of the present invention are described in detail below.

Essentially the same procedure was followed in each of the examples, the examples differing only in the particular soft magnetic material processed or in the annealing schedule employed. The procedure used consisted of the following steps:

(1) A rod of completely annealed soft magnetic material 64 mils in diameter was drawn through successively smaller dies in accordance with customary procedure to a diameter of approximately 2 mils. Intermediate process anneals were employed at diameters above 16 mils.

(2) The cold-worked wire was annealed in accordance with this invention. In Examples 1 through 4, annealing was accomplished by placing the wire in a furnace for the length of time noted. In Examples 5 through 10, the wire was annealed by passing it through a furnace at a speed necessary to give the residence time noted. Unless otherwise specificed, the annealing was conducted in an atmosphere of hydrogen.

(3) The annealed wire was drawn through dies to reduce the diameter to approximately 1 mil.

(4) The one mil diameter wire was flattened by a single pass through a conventional rolling mill to form a tape approximately .3 mils thick and 3.5 mils wide.

*Example 1*

The soft magnetic material processed was an alloy consisting of 4 percent molybdenum, 79 percent nickel, .7 percent magnanese, and the balance iron, all by weight.

Annealing was conducted at a temperature of 300° C. for a period of one hour.

Typical measurements of coercive force and squareness of the finished material were as follows:

| | |
|---|---|
| Coercive force | 3.84 oersteds. |
| Squareness | .968. |

*Example 2*

The soft magnetic material used in this example was the same as that set forth in Example 1.

Annealing was conducted at a temperature of 400° C. for a period of one hour.

Typical measurements of coercive force and squareness along the length of the finished material were as follows:

| | |
|---|---|
| Coercive force | 4.74 oersteds. |
| Squareness | .935. |

*Example 3*

The soft magnetic material used in this example was the same as that set forth in Example 1.

Annealing was conducted at a temperature of 500° C. for a period of one hour.

Typical measurements of coercive force and squareness of the finished material were as follows:

| | |
|---|---|
| Coercive force | 4.44 oersteds. |
| Squareness | .92. |

*Example 4*

The sofe magnetic material used in this example was the same as that set forth in Example 1.

Annealing was conducted at a temperature of 700° C. in an atmosphere of 15 percent hydrogen, 85 percent nitrogen by volume, for a period of one second (a speed of 90 feet per minute in a furnace with 1½ feet heating zone).

Typical measurements of coercive force and squareness along the length of the finished material were as follows:

| Coercive force: | Squareness |
| --- | --- |
| 3.8 oersteds | .93 |
| 3.5 oersteds | .96 |
| 4.0 oersteds | .97 |
| 3.3 oersteds | .93 |

*Example 5*

The soft magnetic material used in this example was the same as that set forth in Example 1.

Annealing was conducted at a temperature of 700° C. for a period of one second (a speed of 22 feet per minute in a furnace with a 4.5-inch heating zone).

Typical measurements of coercive force and squareness along the length of the finished material were as follows:

| Coercive force: | Squareness |
| --- | --- |
| 3.6 oersteds | .93 |
| 3.6 oersteds | .95 |
| 3.7 oersteds | .97 |
| 4.0 oersteds | .95 |

*Example 6*

The soft magnetic material used in this example was the same as that set forth in Example 1.

Annealing was conducted at a temperature of 775° C. for a period of one second. The annealing was conducted in an atmosphere of 15 percent hydrogen, 85 percent nitrogen, by volume.

Typical measurements of coercive force and squareness along the length of the finished material were as follows:

| Coercive force: | Squareness |
| --- | --- |
| 3.6 oersteds | .93 |
| 3.9 oersteds | .95 |
| 3.8 oersteds | .95 |

*Example 7*

The soft magnetic material used in this example was the same as that set forth in Example 1.

Annealing was conducted at a temperature of 800° C. in an atmosphere of 15 percent hydrogen, 85 percent nitrogen, by volume, for a period of one second.

Typical measurements of coercive force and squareness along the length of the finished material were as follows:

| Coercive force: | Squareness |
| --- | --- |
| 3.9 oersteds | .89 |
| 3.8 oersteds | .91 |
| 3.6 oersteds | .89 |
| 3.3 oersteds | .90 |

*Example 8*

The soft magnetic material processed was an alloy consisting of 52 percent nickel, 48 percent iron by weight.

Annealing was conducted at a temperature of 750° C. for a period of one second.

Typical measurements of coercive force and squareness of the finished material were as follows:

| | |
| --- | --- |
| Coercive force | 7 oersteds. |
| Squareness | .8. |

The examples described above are merely illustrative of the present invention are included to aid in the description thereof. The embodiments and examples have been described with respect to wire or tape for simplicity of exposition. It is to be understood that the present invention relates to processing methods which are independent of the shape of the soft magnetic material which is treated. The essence of the present invention resides in cold-working a body of soft magnetic material, annealing such cold-worked body in accordance with the principles outlined above, and then further cold-working the body of soft magnetic material to achieve the desired magnetic properties.

The magnetic memory element depicted in FIG. 3 is intended to be exemplary of an important use of soft magnetic material processed in accordance with the present invention. It is to be understood that soft magnetic material processed in accordance with this invention may be used in the fabrication of magnetic memory elements based on principles of operation different than those of the structure of FIG. 3. The importance of the present methods of fabricating soft magnetic material inheres in the fact tha tthe magnetic properties of the material may be tailored to fit a particular end use. Accordingly, any magnetic devices or structures which require magnetic elements of specific coercive force and hysteresis loop squareness may be fabricated from soft magnetic material processed by this invention.

What is claimed is:

1. The method of fabricating a magnetic memory element utilizing a soft magnetic tape having a minimum coercive force of approximately 3 oersteds; comprising the successive steps of cold-drawing a body of soft magnetic material comprising nickel to produce a wire, said cold-drawing causing an increase in both the coercive force and squareness of the hysteresis loop of said body of soft magnetic material, heat treating said cold-drawn wire at a temperature in the range of from 100° C. up to about 900° C. for one second to 24 hours, the shorter times corresponding with the higher ranges of temperature, the temperatures and times of said heat treatment being so interrelated as to require a minimum time of one second and a maximum time of four seconds for the temperature range of 700° C. up to about 900° C. and a heat treatment of 24 hours at 100° C., further cold-drawing said wire, so as to reduce its diameter a minimum of 5 percent, and flattening said cold-drawn wire to form a tape and winding the cold-worked tape so produced without annealing around a conductor to form a magnetic memory element.

2. The method of claim 1 in which said soft magnetic material comprises nickel in the range of from 45 percent to 80 percent by weight.

3. The method of claim 2 in which said soft magnetic material comprises approximately 4 percent molybdenum, approximately 79 percent nickel and approximately 15.5 percent iron.

4. The method of claim 3 in which the heating step is conducted at a temperature in the range of from approximately 700° C. to approximately 800° C. for a time in the range of from approximately one second to approximately four seconds.

5. The method of claim 3 in which the heating step is conducted at a temperature of approximately 800° C. for a period of approximately one second.

References Cited in the file of this patent

UNITED STATES PATENTS

| | | |
| --- | --- | --- |
| 1,762,730 | McKeehan | June 10, 1930 |
| 1,801,150 | Goldschmidt et al. | Apr. 14, 1931 |
| 2,085,118 | Noll | June 29, 1937 |
| 2,558,104 | Scharshu | June 26, 1951 |
| 2,783,170 | Littmann | Feb. 26, 1957 |